United States Patent [19]

Cina, Jr. et al.

[11] Patent Number: 5,510,808
[45] Date of Patent: Apr. 23, 1996

[54] SCROLLBAR HAVING SYSTEM OF USER SUPPLIED INFORMATION

[75] Inventors: Vincent J. Cina, Jr., Chestnut Ridge; Donald P. Pazel, Croton-on-Hudson, both of N.Y.

[73] Assignee: International Business Machines Corporation, Armonk, N.Y.

[21] Appl. No.: 381,295

[22] Filed: Jan. 31, 1995

Related U.S. Application Data

[63] Continuation of Ser. No. 531,213, May 31, 1990, abandoned.

[51] Int. Cl.⁶ .................................................. G09G 5/34
[52] U.S. Cl. ........................ 345/123; 345/146; 345/118
[58] Field of Search ................................ 345/145, 146, 345/118, 119, 120, 121, 123, 157; 395/157, 159, 156

[56] References Cited

U.S. PATENT DOCUMENTS 4,698,624  10/1987  Banker et al. ........................ 340/709
4,831,556   5/1989  Oono .................................... 340/723
4,961,070  10/1990  Maher et al. ......................... 340/721
5,153,829  10/1992  Furuya et al. ........................ 379/110

Primary Examiner—Richard Hjerpe
Assistant Examiner—Xiao M. Wu
Attorney, Agent, or Firm—Perman & Green

[57] ABSTRACT

Method and apparatus for indicating to a user of a data processing system having a display a location or locations of information within a presentation space. A first step provides on the display a view window for providing a view into a first region of a larger presentation space. A second step displays on the display at least one scrollbar having a moveable indicator for indicating a position of the view window within the presentation space. A third step displays within the scrollbar at least one indicia for indicating a relative location of a feature of interest within the presentation space. The indicia may take the form of alphanumeric characters, symbols, colors, graphical images, audio information and combinations thereof. In response to a user positioning the moveable indicator to a position associated with the at least one indicia a fourth step re-positions the view window to provide a view of a second region of the presentation space, the second region including the feature of interest.

7 Claims, 4 Drawing Sheets

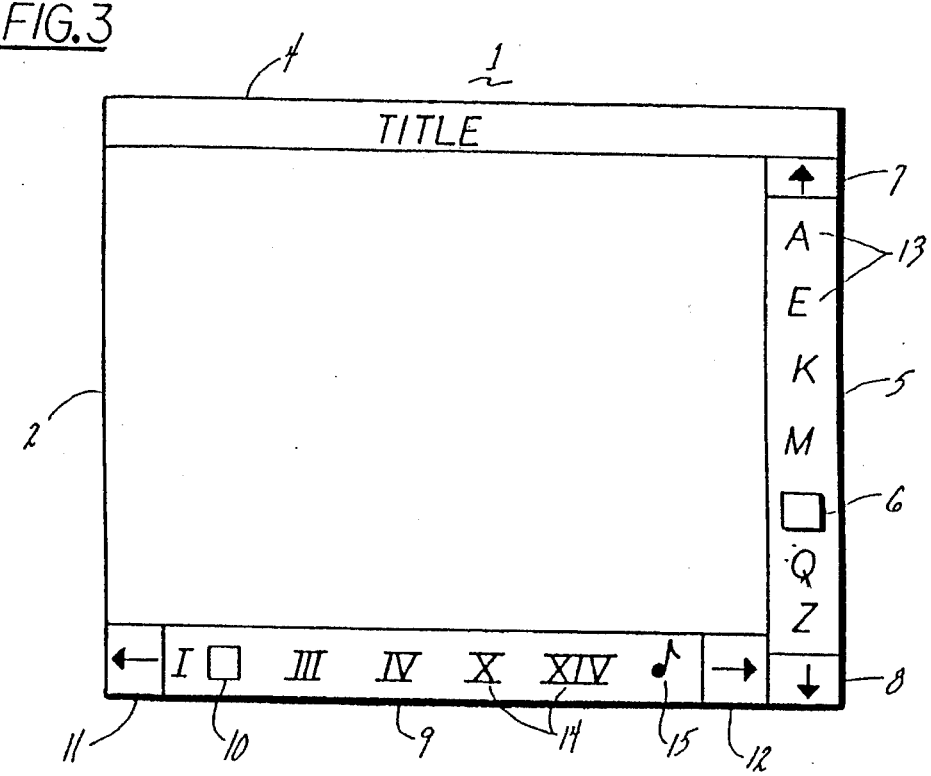
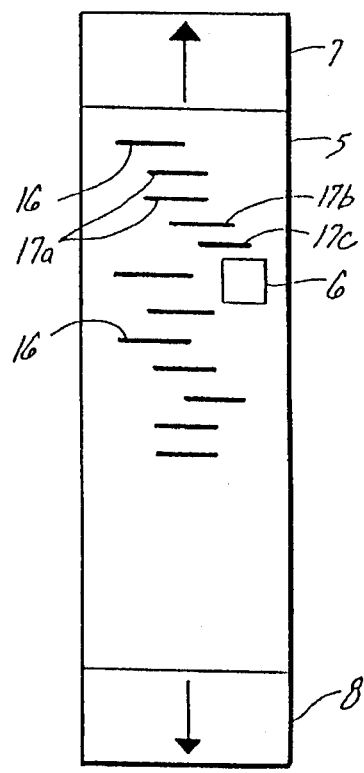
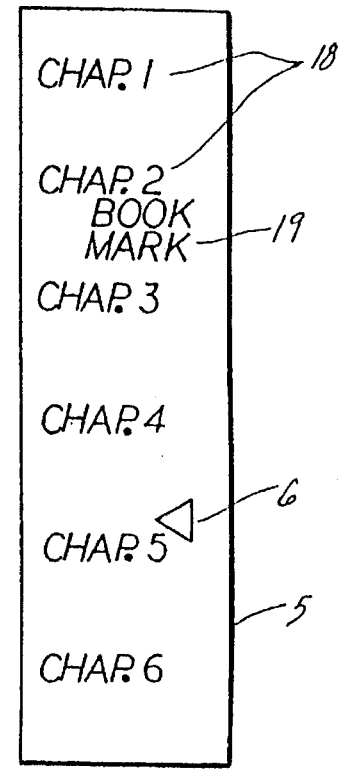

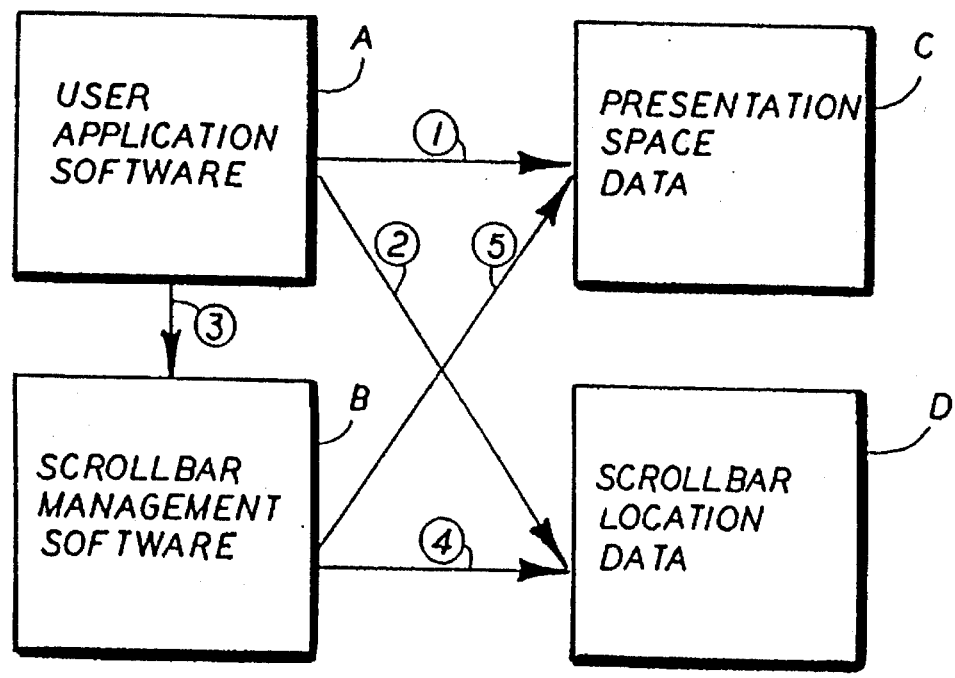

SCROLLBAR HAVING SYSTEM OF USER SUPPLIED INFORMATION

This is a continuation of copending application Ser. No. 07/531,213, filed on May 31, 1990, now abandoned.

FIELD OF THE INVENTION

This invention relates generally to data processing display apparatus and method and, in particular, relates to a scrollbar associated with a display window that provides a view into a presentation space.

BACKGROUND OF THE INVENTION

As depicted in FIGS. 1 and 2 a presentation system employs a window 2 in order to provide a rectangular view of all, or a portion of all, of an application presentation space 1. When displayed on a physical screen 3 the window 2 may be provided with an identifying title block 4, it being realized that some arbitrarily large number of windows may be simultaneously displayed to a user. In order to be effectively employed the window 2 must be capable of being moved, or scrolled, in a vertical and/or a horizontal direction within the presentation space 2. A scrollbar 5 is a well known structure used to visualize the movement of the window 2 over the presentation space 1. An example of a system that employs scrollbars in this manner is the OS/2 Presentation Manager (OS/2 is a registered trademark of the International Business Machines Corporation and Presentation Manager is a trademark of the International Business Machines Corporation).

The scrollbar 5 is often used in conjunction with a pointing device, such as a mouse or a trackball. When the window 2 is too small in either the horizontal or vertical dimension, relative to the dimensions of the presentation space 1, the scrollbar 5 is presented to the user. The vertically disposed scrollbar 5 of FIG. 2 can be seen to contain a slider 6 which is moved with the pointing device in the directions indicated by the direction indicator blocks 7 and 8. As the slider 6 is moved by the user in the desired direction the relative position of the window 2 on the presentation space 1 is moved accordingly. This provides a rapid and efficient method for the user to vertically and/or horizontally scroll the window 2 through the presentation space 1. Many applications that present information on a display utilize this technique to good advantage. Examples of applications using scrollbars are text editors, spread sheets and graphics applications.

The only location information provided by the conventional scrollbar 5 is the relative distance of the window 2 from the edge (top and bottom or left and right) of the presentation space 1. A problem occurs when the window 2 only covers a relatively small area of the presentation space 1 and the user wishes to scroll to specific information within the presentation space 1. This is a common problem which pre-dates the use of modern window systems. For example, by using a word processor a user can edit a very large text file. To locate a specific location within the file the user can inefficiently read through the file, scrolling as necessary. A more efficient technique is for the user to issue a "search" command to automatically search for an occurrence or occurrences of "relatively unique" information. However, if relatively unique information does not exist in the appropriate form or is unknown to the user this latter technique cannot be effectively used. Other methods have also been developed for locating information. For example, if the user determines that locating a specific item of information in the future may be important he may place a "bookmark" at the corresponding location within the file. The bookmark is a program-provided feature employed to subsequently locate the desired information.

The following chronologically ordered U.S. Patents all teach display-related subject matter. In U.S. Pat. No. 4,247,843, issued Jan. 27, 1981, Miller et al. disclose in an avionics application a CRT display that displays an array of major cells and a map memory having map words corresponding to the cells. In U.S. Pat. No. 4,716,404, issued Dec. 29, 1987, Tabata et al. disclose an image retrieval method that includes a step of specifying a sub-image associated with a stored image, the stored image having stored reference data associated therewith. In U.S. Pat. No. 4,734,689, issued Mar. 29, 1988, Kurakake discloses display apparatus that enables a screen to scroll while a cursor is maintained in a readily visible position. In U.S. Pat. No. 4,772,882, issued Sep. 20, 1988 Mical discloses menu item selection performed with a mouse. In U.S. Pat. No. 4,780,709, issued Oct. 25, 1988, Randall discloses a display management system that is said to allow data to be read from window buffers directly onto a visual display without first compiling a bit map frame buffer. In U.S. Pat. No. 4,782,397, issued Nov. 1, 1988, Kimoto discloses image data processing apparatus that includes an edit function. And, in U.S. Pat. No. 4,786,897, issued Nov. 22, 1988, Takanashi et al. disclose a "jump-scroll-icon" used to change a displayed portion of a logical screen.

In a Research Disclosure, dated January 1989, there is disclosed anonymously a visual scaling technique that has a "visual scale" displayed adjacent to a scrollbar. The visual scale is said to provide quantitative point of reference information for end users. This disclosure also states that the visual scaling technique can be used with other forms of scrolling mechanisms or as a scrolling technique "in its own right" that is apparently without a scrollbar.

However none of these references teach, and it is thus an object of the invention to provide, presentation space-related location indicia within a scrollbar; the indicia being generated by a data processing system and/or by a user of the system.

It is a further object of the invention to provide an improved scrollbar and method of using same that has enhanced utility and enhanced human factors characteristics relative to conventional scrollbars.

It is another object of the invention to provide presentation space-related location information within a scrollbar having greater efficiency for the case where the presentation space is significantly larger than a window size.

It is another object of the invention to provide presentation space-related location information within a scrollbar, the location information being dynamically changeable as a function of a physical size of the scrollbar, the relative area of the window to the presentation space and an amount of location information.

It is a still further object of the invention to provide presentation space-related location information within a scrollbar, the location information having the form of, by example, characters, symbols, graphics, color and/or audio cues.

SUMMARY OF THE INVENTION

The foregoing problems are overcome and the objects of the invention are realized by a novel technique of aiding a user in positioning a window over a desired portion of a large presentation space. It is intended that this invention be employed as an optional tool at the disposal of users, in the same manner that scrollbars are also an optional tool.

In accordance with the invention context sensitive visual indicia or information is located within the bounds of a scrollbar. This information can take any form applicable to the application and the capabilities of the data processing system. The information aids the user in locating a desired portion of a presentation space and is referred to herein as "location information". The location information indicates to the user where to position the scrollbar slider within the scrollbar in order to achieve the desired positioning within the presentation space.

In greater detail the invention pertains to method and apparatus for indicating to a user of a data processing system having a display a location or locations of information within a presentation space. A first step provides on the display a view window for providing a view into a first region of a larger presentation space. A second step displays on the display at least one scrollbar having a moveable indicator for indicating a position of the view window within the presentation space. A third step displays within the scrollbar at least one indicia for indicating a relative location of a feature of interest within the presentation space. The indicia may take the form of alphanumeric characters, symbols, colors, graphical images, audio information and combinations thereof. In response to a user positioning the moveable indicator to a position associated with the at least one indicia a fourth step re-positions the view window to provide a view of a second region of the presentation space, the second region including the feature of interest. Vertical and/or horizontal scrollbars may each contain appropriate location information.

BRIEF DESCRIPTION OF THE DRAWING

The above set forth and other features of the invention are made more apparent in the ensuing Detailed Description of the Invention when read in conjunction with the attached Drawing, wherein:

FIG. 3 illustrates a window having, by example, both horizontal and vertical scrollbars associated therewith, each of the scrollbars containing, in accordance with the invention, presentation space-related location information;

FIG. 4 illustrates one embodiment of a scrollbar having graphical indicia indicative of logical nesting levels of computer program instructions;

FIG. 5 illustrates another embodiment of a scrollbar having system or user generated textual information illustrating the relative locations of chapters of a document and also having a user generated "book mark" positioned within one of the chapters;

FIG. 8 illustrates in detail a memory organization and interaction of various elements of the invention.

DETAILED DESCRIPTION OF THE INVENTION

Figure 1:
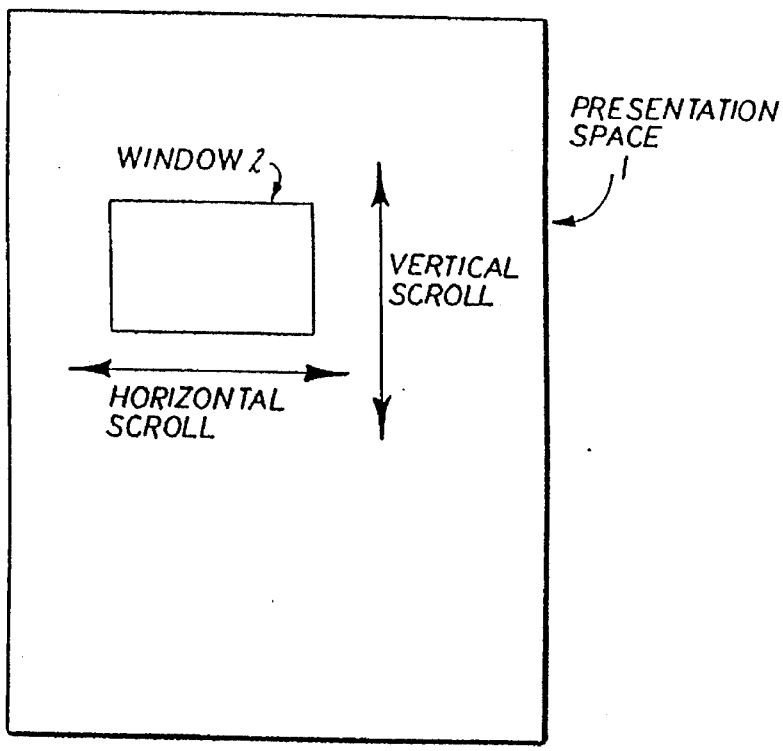
FIG. 1 illustrates a presentation space having a window positioned therein.
Figure 2:
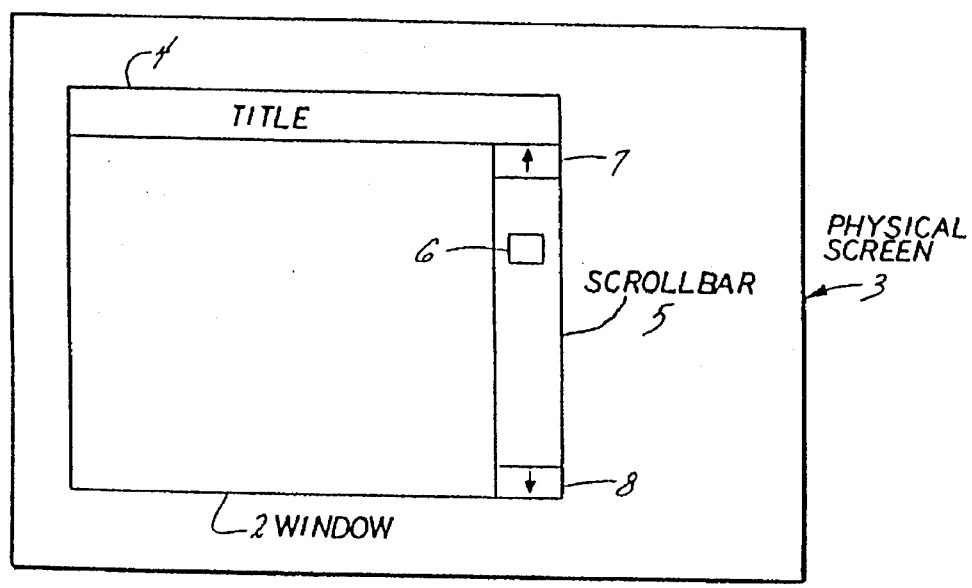
FIG. 2 illustrates the window positioned upon a physical display screen, the window having, by example, a vertical scrollbar associated therewith.
Figure 6:
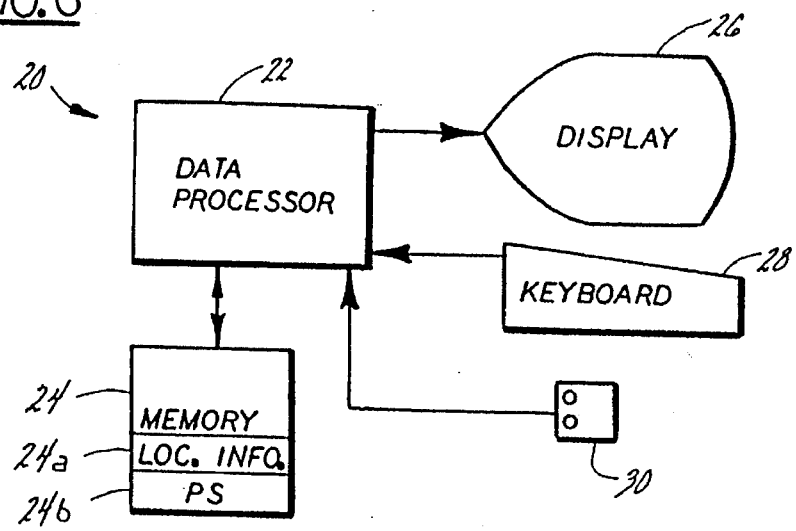
FIG. 6 is a block diagram of a data processing system suitable for practicing the invention.

Referring first to FIG. 6 there is shown in block diagram form one embodiment of a data processing system 20 suitable for practicing the invention. System 20 includes a data processor 22 having a memory 24 bidirectionally coupled thereto. The memory 24 includes program and data memory, including storage for programs that implement the teaching of the invention. Also stored within memory 24 is, in accordance with the invention, location information 24a for display within a scrollbar and also storage 24b for a presentation space that is displayed upon a display device 26. Also coupled to data processor 22 is a user data entry device, typically a keyboard 28, whereby the user interacts with the system 20. Although not essential to the practice of the invention the system 20 also preferably includes a pointing device 30, such as a mouse or a trackball, for positioning a window within the presentation space. If the pointing device 30 is not provided the user may use pre-defined keys of the keyboard 28 to position the window within the presentation space. By example, the system 20 may be embodied in an IBM PS/2 computer (IBM and PS/2 are both registered trademarks of the International Business Machines Corporation).

Referring now to FIG. 3 there is shown a window 2 having a title block 4 and, in accordance with the invention, a first, vertical scrollbar 5 provided with location information. In this embodiment the location information has the form of characters 13. Further in accordance with this embodiment of the invention the window 2 also has a second, horizontal scrollbar 9 which has a horizontal slider 10 and direction indicators 11 and 12. The location information within the horizontal scrollbar 9 has the form of symbols, in this case Roman numeral symbols 14 and a special symbol 15 which, in accordance with an aspect of the invention, indicates the location within the presentation space of audio information, such as voice prompt or cue.

In accordance with the invention the user of the system is enabled, via the location information within the scrollbars 5 and 9, to rapidly position the horizontal slider 10 and/or the vertical slider 6 to move the window 2 to within a desired region of the larger presentation space 1.

Referring to FIG. 4 there is shown another embodiment of a vertical scrollbar 5 having location information in the form of linear graphical symbols 16 and 17. The embodiment of FIG. 4 is especially useful for locating information within a structured text file, such as an outline or a computer program written with nested programming routines, subroutines and instructions. That is, the graphical symbols 16 may represent major program subdivisions while the graphical symbols 17a represent subdivisions within the first major division. Other, further indented symbols 17b and 17c represent further subdivisions. The use of such a structure enables a user to rapidly position the slider 16 to locate a desired position within the structured text file.

FIG. 5 is yet another example of a vertical scrollbar 5 having location information. In the embodiment of FIG. 5 the slider 6 is shown to have a triangular form and the location arrows 7 and 8 are not used. In this embodiment the location information takes the form of textual information 18 and 19. By example, the location information is comprised of word processing or desk top publishing application-generated chapter headings 18 that correspond to pre-determined locations within an associated text file (the presentation space for the application). The vertical spacing between adjacent chapter headings is indicative of a relative size of the associated chapter. As can be seen, chapter 5 contains considerably more textual information than does chapter 1 or chapter 3. Further in accordance with the invention the location information also includes a user provided "bookmark" 19 that the user has inserted within chapter 2 to mark his position. The user is thus enabled to position the slider 6 to the bookmark 19 to rapidly locate a desired location within chapter 2 of a document being processed. Also, the user is enabled to rapidly locate, by example, the beginning of chapter 5 or some other position within chapter 5. This is accomplished without requiring specific information as to the contents of chapter 5 and furthermore does not require that the user scroll either from the beginning or from the end of the document until chapter 5 is located.

It should be noted that the location information may take the form of a number representing the chapter number, a special symbol, or simply a line. Furthermore, the specific form of the location information may be user selectable or application selectable. The form of the location information may also depend on dynamic factors, such as the relative vertical coverage of the window over the presentation space, the physical vertical size of the window, and the number of chapters.

In addition to the foregoing examples of location information a specific color and/or font may be used to differentiate chapter start location information from other types of location information. In another case, where there may be many chapters with limited physical vertical space, and the current vertical size of the window is relatively small as compared to the vertical size of the presentation space, location information that indicates chapter start locations may simply be expressed as a horizontal line, possibly using a specific color. A special symbol could also be used.

Documentation section, sub-section, and page boundary location information may be used the same way, with different symbols, colors and fonts being used to differentiate between different levels of document division. Different symbols, colors and fonts may also be used as location information to represent other portions of a document, such as the preface, forward, appendix, glossary, bibliography and index.

As a further example a specific color or symbol is inserted by the application into the scrollbar 5 to indicate those portions of the document that have been most recently or last modified.

Search command results may also be indicated by scrollbar location information. That is, a command to find all occurrences of a specific character string results in location information being written to the vertical scrollbar, the location information indicating each occurrence of the search string within the document. As a result, the user is enabled to selectively choose which occurrences to view within the window.

If the application provides for annotation of the document, location information can indicate the position of such annotation. The annotation could be text or gestures written by a reviewer or be in the form of digitized voice comments associated with that portion of the document. Special symbols or audio prompts within the scrollbar indicate the location of voice annotation.

What follows now are several examples of other embodiments of the invention. As should be apparent, scrollbar location information may be structured and selected to represent a large variety of information found within a presentation space.

In a spread sheet application the spread sheet typically contains many columns of information, making the spread sheet much wider (horizontally) than the current window size. By example, there may be a column heading for each week of every month for several years. As a result, there may be hundreds of columns, with only a few being displayed in the window at one time.

The location information may be employed to indicate where year and month boundaries occur. Characters, color, fonts and special symbols can be used for this purpose. By example, the color red may be used to indicate a column having a value out of a predetermined range, such as a negative balance.

Both vertical and horizontal scrolling are typically both used at the same time on large spread sheets. The bookmark technique described above is useful where both vertical and horizontal scrolling are used in that a bookmark might place the same location information symbol in both the horizontal and vertical scrollbars. Selecting either location information symbol thus causes both horizontal and vertical scrolling to occur.

A further example is a file system application, such as the OS/2 Presentation Manager file system (Presentation Manager is a trademark of the International Business Machines Corporation). This is a specific example of a general, sorted list application wherein a lengthy vertical list of sorted names is displayed. The list might represent directory or file name entries. In accordance with the invention a scrollbar is presented having location information for indicating where significant entries appear, for example, the first entry that starts with the letter P. This case is similar to the case of chapters in the word processing example described above. Depending on the relationship between the number of entries in the list, the physical size of the window, how much of the presentation space is covered by the window and the distribution of entries in the collating sequence, different techniques are used to place appropriate location information within the scrollbar.

In the case of a directory tree display, a symbol representing the shape of the tree may be portrayed as location information within the scrollbar.

A further example of the utility of the invention is a graphics processing program that provides a window into the presentation space. If the application provides a zoom function the zoom window may cover, depending upon the selected magnification, only a relatively very small portion of the entire presentation space. The location information bookmark technique described above may be used to locate selected portions of the graphics presentation space. As above, these "bookmarks" may include voice annotation.

If the presentation space employs the use of color in a special way, such as the color red indicating abnormally high temperature on a thermal sensitive image, the graphics application may place color coded location information within the scrollbars to indicate to the user those areas of the presentation space image that are determined to be above some temperature threshold.

Figure 7:
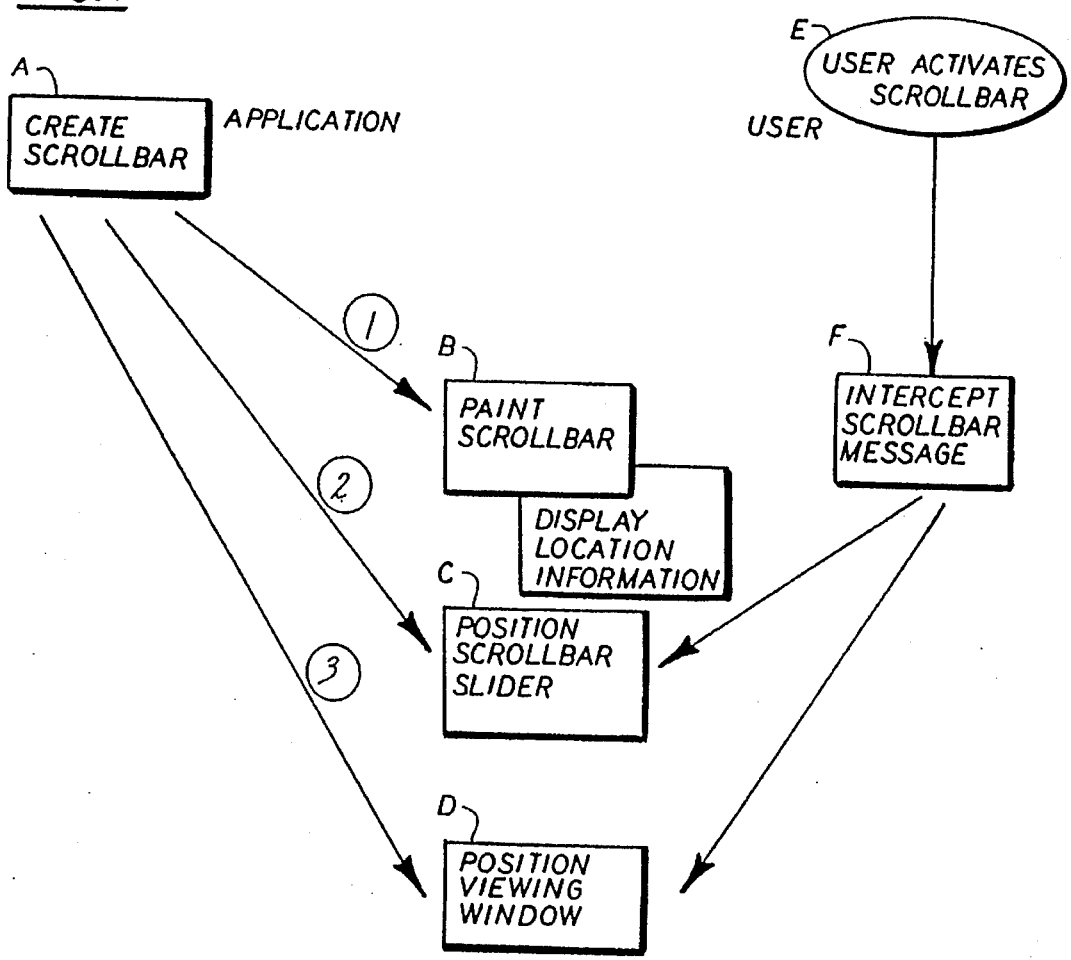
FIG. 7 depicts a logical relationship of scrollbar creation and maintenance with user interaction with the scrollbar.

A method outlining an implementation of scrollbars with location information is shown in FIG. 7 and is presented in a message passing paradigm similar to that found in the Presentation Manager in OS/2. In that model, scrollbars are used to aid in displaying a given drawing or presentation space through a window aptly termed a viewing window. The scrollbars may be created along with the window and are used to aid in determining where to position the viewing window on the presentation space. The application specifies to the Presentation Manager a range of values for each scrollbar, the range of values being a linear representation for all vertical or horizontal positions on the presentation space that the window may be positioned. The range of values thereby correspond to all locations within the scrollbar wherein the scrollbar slider may be positioned.

User actions on the scrollbars are passed by the Presentation Manager to the application as messages which the application must manage. Two types of user actions commonly occur.

A first action involves the user indicating a unit change in current slider position, as in scrolling a single line or page up or down.

A second action involves the user indicating some arbitrary slider position.

These actions are materialized as application messages in Presentation Manager. These messages describe the type of user action and indicate the new slider position. The application responds to these messages generally by repositioning the viewing window over the presentation space accordingly.

Referring to FIG. 7 it is assumed that the application has available a predefined set of markers that describe display features of the presentation space. The implementation of scrollbars with location information is described through the management of the following activities: creation of the scrollbar (Block A), painting the scrollbar image (Block B), positioning the scrollbar slider within the scrollbar (Block C), interception of scrollbar related messages (Block F) and repositioning the viewing window over the presentation space (Block D).

As a result of the occurrence of Block A there results three application messages, namely to paint the image of the scrollbar (1), to position the slider appropriately over the scrollbar image (2), and to position the viewing window over the presentation space according to the position indicated by the scrollbar slider (3).

In accordance with the invention, after the scrollbar image is painted the various markers expressive of location information are drawn at the appropriate positions in the scrollbar presentation space as dictated by an application-defined mapping of a designated dimension of the presentation space to the scrollbar's presentation space.

When the user subsequently acts on the scrollbar (Block E), the Presentation Manger sends appropriate messages to the application reflecting these actions along with an indication of the new slider position. These messages are captured and interpreted into further actions (Block F). One message causes the scrollbar slider to be positioned appropriately over the scrollbar image (Block C). Another message causes the viewing window to be accordingly repositioned over the presentation space in accordance with the indicated location information. (Block D).

Referring to FIG. 8 there is shown in greater detail an exemplary organization of memory 24 and the interaction of the various elements stored therein. The memory 24 stores four main elements, namely: user application software (BLOCK A) that invokes and takes advantage of the invention, scrollbar management software (BLOCK B) that implements the teaching of the invention, presentation space data (BLOCK C) used to draw the primary display, and scrollbar location data (BLOCK D) used to draw the scrollbar and correlate position to the primary display. Communication paths between these various blocks are indicated by the arrows numbered one through five.

In accordance with an example of the utilization of the invention a generic spreadsheet application (corresponding to BLOCK A of FIG. 8) is next described. In this example, the spreadsheet has columns labeled 1-N while a main display area is only capable of displaying a few of the columns at any given time.

One implementation represents the columns depicted within a horizontal scrollbar proportionately to the columns of the presentation space. More specifically, given that the presentation space is composed of horizontal and vertical space in uniform units, each column's width may be denoted by a term width_ps(i) where (i) is (1, . . . ,N). The total width of the presentation space is therefore given by t_ps, where $$t\_ps = \sum_{i=1}^{N} width\_ps(i).$$

Let t_sb be the total width of the scrollbar presentation space in some uniform unit in that space.

From this information the location of the column markers 1 through N on the scrollbar are derived. Using strict proportionality, the width of a section of the scrollbar presentation space representing the respective column is given by width_sb, where width_sb(column)=(t_sb×width_ps(column) )/t_ps and would begin at $$col\_start\_sb(column) = \sum_{i=1}^{column-1} width\_sb(i).$$

Thus, the location information marker on the scrollbar for column j, which is some representation for that column, is positioned midway between:

col_start_sb(column) and col_start_sb (column)+width_sb(column).

There is next considered the positioning of the window over the main presentation space given a slider position on the scrollbar. First, an assumption is made that a slider position, p_sb, identifies the position of the left end of the slider in the scrollbar presentation space. In that this example employs a strict proportionality model, the left end of the window is thus positioned at p_ps, where p_ps=(t_ps×p_sb)/t_ps.

Although the invention has been described above in the context of a specific Presentation Manager it should be realized that the teaching of the invention has wider scope and is applicable to a number of different types of display systems and display managers. Furthermore, the exemplary applications and location information indicia disclosed above are not intended to limit the practice of the invention to only these examples. Thus, while the invention has been particularly shown and described with respect to a presently preferred embodiment thereof, it will be understood by those skilled in the art that changes in form and details may be made therein without departing from the scope and spirit of the invention.

Having thus described our invention, what we claim as new, and desire to secure by Letters Patent is:

1. In a data processing system having display means for displaying information to a user, a method for enabling a user to access predetermined information that is stored within a memory means of the data processing system, the predetermined information being associated with a location within a presentation space, comprising the steps of:

displaying a view window for providing a view into a localized region of the presentation space;

displaying at least one scrollbar having an indicator for indicating a position of the view window within the presentation space, the at least one scrollbar being displayed so as to occupy a linear region that is bounded by first and second ends that represent an extent of the presentation space along an axis of the presentation space;

displaying at least one indicia that is predeterminally positioned at a point along the linear region, relative to the first and second ends, that corresponds to a position, within the presentation space, of the location of the predetermined information, the indicia being selected from a group consisting essentially of alphanumeric characters, symbols, colors, graphical images, audio information and combinations thereof and is selected by one of an application program running on the data processing system and a user of the data processing system; and responsive to a user positioning the indicator to a location at or near the location of the at least one indicia, positioning the view window to provide a view of a localized region of the presentation space that includes the location associated with the predetermined information, whereby the user is enabled to gain access to the predetermined information that is stored in the memory means.

2. In a data processing system having display means for displaying information to a user, a method for enabling a user to locate instances of specific information within a document that is stored within a memory means of the data processing system, comprising the steps of:

displaying a view window for providing a view into a localized region of a presentation space that corresponds to the document;

displaying at least one scrollbar having an indicator for indicating a position of the view window within the presentation space, the at least one scrollbar being displayed so as to occupy a linear region that is bounded by first and second ends that represent an extent of the presentation space along an axis of the presentation space;

in response to an execution of a search command that is initiated by the user, searching the document to locate instances of specific information that is specified by the user in conjunction with the initiation of the search command;

for individual ones of located instances of the specific information within the document, displaying an indicia that is predeterminally positioned at a point along the linear region, relative to the first and second ends, that corresponds to a position, within the presentation space, of the located instance of the predetermined information within the document; and responsive to a user positioning the indicator to a location at or near the location of a displayed indicia, positioning the view window to provide a view of a localized region of the presentation space that includes a portion of the document that includes a located instance of the predetermined information that is associated with the one of the displayed indicia.

3. A method as set forth in claim 2 wherein the indicia is selected from a group consisting essentially of alphanumeric characters, symbols, colors, graphical images, audio information and combinations thereof.

4. In a data processing system having display means for displaying information to a user, a method for enabling a user to ascertain an organization of a data structure that is stored within a memory means of the data processing system, comprising the steps of:

displaying a view window for providing a view into a localized region of a presentation space that corresponds to the data structure, the data structure being partitioned into a plurality of data structure sub-structures;

displaying at least one scrollbar having an indicator for indicating a position of the view window within the presentation space, the at least one scrollbar being displayed so as to occupy a linear region that is bounded by first and second ends that represent an extent of the presentation space along an axis of the presentation space;

displaying a plurality of indicia, individual ones of the displayed indicia being predeterminally positioned at a point along the linear region, relative to the first and second ends, that corresponds to a location within the presentation space of a location of one of the data structure sub-structures; and responsive to a user positioning the indicator to a location at or near the location of one of said displayed indicia, positioning the view window to provide a view of a localized region of the presentation space that includes a portion of the data structure that includes a data structure sub-structure that is associated with the one of the displayed indicia.

5. A method as set forth in claim 4 wherein the indicia is selected from a group consisting essentially of alphanumeric characters, symbols, colors, graphical images, audio information and combinations thereof.

6. In a data processing system having display means for displaying information to a user and audio means for outputting audio signals to a user, a method for enabling a user to hear an instance of a pre-recorded audio annotation that is associated with a data file that is stored within a memory means of the data processing system, comprising the steps of:

displaying a view window for providing a view into a localized region of a presentation space that corresponds to the data file;

displaying at least one scrollbar having an indicator for indicating a position of the view window within the presentation space, the at least one scrollbar being displayed so as to occupy a linear region that is bounded by first and second ends that represent an extent of the presentation space along an axis of the presentation space;

for individual ones of pre-recorded audio annotations that are associated with the data file, displaying an indicia that is predeterminally positioned at a point along the linear region, relative to the first and second ends, that corresponds to a position, within the presentation space, of the pre-recorded audio annotation; and responsive to a user positioning the indicator to a location at or near the location of a displayed indicia, positioning the view window to provide a view of a localized region of the presentation space that includes a portion of the data file that includes a pre-recorded audio annotation that is associated with the one of the displayed indicia, thereby enabling the pre-recorded audio annotation to be output to the user as an audio signal.

7. A method as set forth in claim 6 wherein the indicia is selected from a group consisting essentially of alphanumeric characters, symbols, colors, graphical images, audio information and combinations thereof.

* * * * *